US010292558B2

(12) United States Patent
Graves et al.

(10) Patent No.: US 10,292,558 B2
(45) Date of Patent: May 21, 2019

(54) VACUUM HOSE RETRACTION SYSTEM (71) Applicant: M.D. Manufacturing, Inc., Bakersfield, CA (US)

(72) Inventors: Brian Graves, Bakersfield, CA (US); Crispin Mercado, Bakersfield, CA (US)

(73) Assignee: M.D. Manufacturing, Inc., Bakersfield, CA (US)

( * ) Notice: Subject to any disclaimer, the term of this patent is extended or adjusted under 35 U.S.C. 154(b) by 500 days.

(21) Appl. No.: 15/050,953

(22) Filed: Feb. 23, 2016

(65) Prior Publication Data
US 2016/0242612 A1 Aug. 25, 2016

Related U.S. Application Data (60) Provisional application No. 62/120,874, filed on Feb. 25, 2015.

(51) Int. Cl.
*A47L 9/00* (2006.01)
*A47L 9/24* (2006.01)
(Continued)

(52) U.S. Cl.
CPC .............. *A47L 9/244* (2013.01); *A47L 9/0036* (2013.01); *A47L 9/242* (2013.01); *A47L 9/248* (2013.01);
(Continued)

(58) Field of Classification Search
CPC .......... A47L 9/242; A47L 9/244; A47L 9/248; A47L 9/0036; A47L 5/38; F16L 27/12; F16L 37/05; F16L 37/06
(Continued)

(56) References Cited

U.S. PATENT DOCUMENTS 2,051,728 A   8/1936 Manning
2,953,806 A   9/1960 Walker
(Continued)

FOREIGN PATENT DOCUMENTS

CA   880976   9/1971
CA   881627   9/1972
(Continued)

OTHER PUBLICATIONS

Hide-A-Hose Central Vacuum Systems, Retractable Hose Central Vacuum System Product Brochure.
(Continued)

*Primary Examiner* — Bryan R Muller
(74) *Attorney, Agent, or Firm* — William K. Nelson; Mark D. Miller; Jared E. Christensen (57) ABSTRACT The present invention provides unique portable or stationary hose retraction systems in a single compact unit having a hose, a chamber or plenum for storing the hose, a vacuum source, and a unique valve mechanism attached to the chamber or plenum for holding the hose in place while it is being used, and releasing the hose to allow it to be extended by the user or retracted by the system using the vacuum source. An optional debris collection chamber with filter may be provided adjacent to the vacuum hose chamber, such that the vacuum source draws air through both the debris collection chamber and through the vacuum hose chamber.

14 Claims, 4 Drawing Sheets (51) Int. Cl.
*F16L 27/12* (2006.01)
*F16L 37/05* (2006.01)
*A47L 5/38* (2006.01)

(52) U.S. Cl.
CPC .............. *F16L 27/12* (2013.01); *F16L 37/05* (2013.01); *A47L 5/38* (2013.01)

(58) Field of Classification Search
USPC .................... 285/7, 337, 104, 105, 113, 376
See application file for complete search history.

(56) References Cited

U.S. PATENT DOCUMENTS

| | | | |
|---|---|---|---|
| 3,023,447 A | | 3/1962 | Senne |
| 3,213,480 A | | 10/1965 | Miller |
| 3,353,996 A | | 11/1967 | Hamrick |
| 3,464,859 A | | 9/1969 | Hamrick |
| 3,520,725 A | | 7/1970 | Hamrick |
| 3,568,240 A | | 3/1971 | Hamrick |
| 3,593,363 A | | 7/1971 | Hamrick |
| 3,651,536 A | | 3/1972 | Bolzan, Jr. et al. |
| 3,682,500 A | | 8/1972 | Hamrick |
| 3,911,944 A | | 10/1975 | Hukuba et al. |
| 3,942,963 A | | 3/1976 | Tevis |
| 3,958,297 A | | 5/1976 | Hukuba et al. |
| 3,977,037 A | | 8/1976 | Miyake et al. |
| 3,977,038 A | | 8/1976 | Hukus et al. |
| 4,050,113 A | * | 9/1977 | Wright .................... A47L 9/244 15/315 |
| 4,211,457 A | | 7/1980 | Meadows |
| 4,246,675 A | | 1/1981 | Costanzo |
| 4,259,066 A | | 3/1981 | Pietschmann |
| 4,316,304 A | | 2/1982 | Parise et al. |
| 4,336,427 A | | 6/1982 | Lindsay |
| 4,462,649 A | | 7/1984 | Medford et al. |
| 4,564,457 A | | 1/1986 | Cairo, Jr. et al. |
| 4,634,197 A | | 1/1987 | Horlacher, Jr. |
| 4,688,292 A | * | 8/1987 | Schmiegel ................ A47L 5/38 15/315 |
| 4,688,596 A | | 8/1987 | Liebmann et al. |
| 4,846,712 A | | 7/1989 | Holden et al. |
| 4,894,020 A | | 1/1990 | Holden et al. |
| 4,895,528 A | | 1/1990 | Choiniere et al. |
| 5,069,635 A | | 12/1991 | Holden et al. |
| 5,119,843 A | | 6/1992 | Keenan |
| 5,402,551 A | | 4/1995 | Workhoven et al. |
| 5,430,978 A | | 6/1995 | Kohler |
| 5,526,842 A | | 6/1996 | Christensen |
| 5,578,795 A | | 11/1996 | Ward |
| 5,740,581 A | | 4/1998 | Harrelson, II |
| 5,740,582 A | | 4/1998 | Harrelson, II |
| 6,058,560 A | | 5/2000 | Gab et al. |
| 6,143,996 A | | 11/2000 | Skanda |
| 6,158,080 A | | 12/2000 | Schlapkohl |
| 6,182,327 B1 | | 2/2001 | Gosselin |
| 6,427,284 B1 | | 8/2002 | Harrelson, II et al. |
| 6,459,056 B1 | | 10/2002 | Graham |
| 6,817,058 B1 | | 11/2004 | Harrelson, II |
| 6,948,527 B2 | | 9/2005 | Ragner et al. |
| 7,010,829 B2 | * | 3/2006 | Harman .................... A47L 5/38 15/314 |
| 7,226,302 B2 | | 6/2007 | Walter et al. |
| 7,306,012 B2 | | 12/2007 | Stockton et al. |
| 7,363,679 B2 | | 4/2008 | Zimmerle et al. |
| 7,640,620 B2 | | 1/2010 | Stockton |
| 7,653,962 B2 | | 2/2010 | Gordon |
| 7,793,384 B1 | | 9/2010 | Kerr |
| 7,945,990 B2 | | 5/2011 | Gabric et al. |
| 3,001,650 A1 | | 8/2011 | Trotter |
| 8,479,353 B2 | | 7/2013 | Drivstuen et al. |
| 8,590,098 B2 | * | 11/2013 | Smith ........................ A47L 5/38 137/355.23 |
| 9,717,381 B2 | * | 8/2017 | Harman .................... A47L 5/38 |
| 9,782,047 B2 | * | 10/2017 | Nieschwitz ........... A47L 9/0009 |
| 10,010,229 B2 | * | 7/2018 | Drivstuen ................. A47L 5/38 |
| 2001/0022009 A1 | | 9/2001 | Spearman |
| 2002/0013974 A1 | | 2/2002 | Gibson et al. |
| 2002/0069477 A1 | | 6/2002 | Smith et al. |
| 2005/0022329 A1 | | 2/2005 | Harman et al. |
| 2005/0018322 A1 | | 8/2005 | Snyder |
| 2005/0246854 A1 | | 11/2005 | Stockton |
| 2005/0246855 A1 | | 11/2005 | Stockton et al. |
| 2007/0017059 A1 | | 1/2007 | Zimmerle et al. |
| 2007/0157425 A1 | | 7/2007 | Battle |
| 2007/0174991 A1 | * | 8/2007 | Trotter ....................... A47L 5/38 15/314 |
| 2007/0174992 A1 | | 8/2007 | Murray et al. |
| 2009/0188072 A1 | | 7/2009 | Gabric et al. |
| 2009/0188073 A1 | | 7/2009 | Gabric et al. |
| 2010/0024152 A1 | * | 2/2010 | Drivstuen ................. A47L 5/38 15/314 |
| 2012/0304414 A1 | | 12/2012 | Harman |
| 2014/0259509 A1 | | 9/2014 | Harman |
| 2014/0259517 A1 | | 9/2014 | Andrews |
| 2015/0047144 A1 | | 2/2015 | Coesel |

FOREIGN PATENT DOCUMENTS

| | | |
|---|---|---|
| CA | 908915 | 9/1972 |
| CA | 2258557 | 10/2006 |
| WO | 0124677 A1 | 4/2001 |
| WO | 2002071910 A1 | 9/2002 |

OTHER PUBLICATIONS

International Search Report and Written Opinion in corresponding PCT Patent Application No. PCT/US2016/019400, dated May 13, 2016.

* cited by examiner

VACUUM HOSE RETRACTION SYSTEM

This application claims the benefit of U.S. Provisional Application No. 62/120,874 filed on Feb. 25, 2015, which is incorporated herein by this reference in its entirety.

FIELD OF THE INVENTION

The present invention relates to vacuum systems, and more particularly to vacuum systems that include retractable suction hoses that are drawn into a chamber using pressure provided from a vacuum source.

SUMMARY OF THE INVENTION

The present invention provides improved hose retraction mechanisms for portable or stationary vacuum systems that is novel over conventional vacuum systems. Embodiments of the retractable hose systems of the present invention may be adapted for use with any new or existing fluid vacuum or suction system (air, water, gas) where it is desirable to retract a suction hose. Potential applications include without limitation, hoses used with medical devices, hoses used with dental devices, swimming pool hoses, gardening hoses, exhaust ducting, and the like. Embodiments of the present invention may also be adapted for use with other retractable items such as electrical cords and the like.

Embodiments of the present invention include an elongated hose configured to retract through a valve assembly into a chamber or plenum. The hose itself may or may not be used for suction purposes; however the hose is housed in a chamber or plenum having a vacuum source that is used to perform retraction of the hose. A typical vacuum cleaning system may include one or more motors that create a partial vacuum in the hose and/or chamber or plenum. In alternative embodiments, a vacuum source may be external to the chamber or plenum, but is attached thereto in order to provide a partial vacuum inside. During use, the hose may be pulled to a desired length from the chamber or plenum through a hose outlet port in the valve assembly, located on the surface of the chamber or plenum. Once the operator is finished using the hose, the partial vacuum in the chamber or plenum may be used to draw the hose back into the chamber through the operation of a valve assembly described more fully herein below.

The vacuum systems disclosed herein do not require an additional retraction mechanism for the hose or cord (i.e., no mechanical winding mechanism is needed), nor a second motor to create a vacuum in the chamber. A single vacuum motor that is connected to both the hose and the chamber (whether internal or external) may provide vacuum suction through the hose, and also provide sufficient pressure, when desired, to retract the hose through the hose outlet port and into the chamber, regardless of the length of the hose. In some embodiments, and without limitation, the system may draw the hose into the hose chamber without any guides, windings, or sleeves for gathering the hose within the chamber, although it is preferable to provide such guides especially with longer hoses.

Embodiments of the present invention may include a unique valve assembly at the hose outlet port that may both prevent the hose from being retracted into the chamber or plenum during use, and also seal the exterior of the hose to the chamber such that the negative pressure (suction) at the distal end of the vacuum hose is optimized. The valve may be opened and closed by the operator as needed.

Embodiments of the valve assembly may be adjustable from a first open or unsealed position where the vacuum hose can move freely through the valve assembly for extension or retraction, to a closed or sealed position where the vacuum hose is in sealed communication with a sealing boot, and where the vacuum hose is substantially fixed in place relative to the valve assembly.

Embodiments of the valve assembly may comprise a moveable sealing boot that is positioned around the hose and adjacent to the outlet port, a flared receiver at the outlet port for engagement with the sealing boot, and a locking mechanism for securing the sealing boot in a closed position while the hose is in use. In some implementations, and without limitation, the sealing boot may have conical shape and the flared receiver in the outlet port may have a complementary shape, such that when the sealing boot is pressed inward toward the flared receiver and the chamber (the "sealed" position), an airtight seal or substantially airtight seal is created between the sealing boot and the flared receiver. In the sealed position, an airtight or substantially airtight seal is also created between the sealing boot and the hose as well. In those systems where suction is provided through the hose, the sealed position allows air or fluid intake through only the distal end of the hose and optimizes the suction power of the system during use.

In the open or unsealed position, the sealing boot may be pulled away from the flared receiver allowing the operator to either pull the hose from the chamber to a desired length, or release the hose and allow it to be drawn into the chamber solely by the negative pressure in the chamber. This negative pressure may be created by the single (or multiple) vacuum motor(s), or may be provided to the chamber from an outside source. In the open condition, the sealing boot allows the hose to pass freely through the outlet port; in this position the negative pressure in the chamber is sufficient to draw the hose into the chamber regardless of the length of the hose (assuming that the vacuum source is operating, sufficient negative pressure is available and that the chamber is of sufficient size). It is not necessary to close off the hose itself in order to draw it back into the chamber; the negative pressure exerted on both the interior and exterior surfaces of the hose efficiently draws the hose into the chamber once the user opens the valve and releases the hose. It is not necessary to provide a tight fit between the hose and the boot, nor is it necessary to provide any rings or other structures on the exterior of the hose in order to create sufficient suction on the hose to draw it into the chamber. It is to be understood that embodiments that include multiple vacuum motors to create negative pressure in the chamber are contemplated within the scope of the present invention; such additional motors are ordinarily added to increase the suction (cleaning) capacity of the system, not necessarily for the purpose of retracting the hose, although this is also possible.

Embodiments of the invention may be portable or stationary. Stationary cleaning systems may include a fixed-position hose chamber and a hose of a sufficient length that allows the operator to vacuum large buildings, areas, etc. (e.g., homes, warehouses of 10,000 square feet or greater, etc.) without having to move the unit. Such stationary systems do not require installation and can be simply placed in an appropriate area (e.g., a closet, in corner of a laundry room, under a bed, etc.). Other applications for stationary systems may include dental offices, medical facilities, swimming pools, and the like where a hose is used for defined purpose after which it needs to be retracted to be out of the way. Other embodiments include portable models (e.g., upright and wheeled, backpack, or carried versions) that can be moved from area to area. Still further embodiments may include systems having elongated hoses located in portable chambers or plenums that can be connected to a whole-house vacuum system, which supplies the negative pressure for both the hose and hose retraction.

In some embodiments, and without limitation, the present invention relates to an apparatus that includes a vacuum hose; a vacuum hose chamber for storing the vacuum hose; an optional debris collection chamber adjacent to the vacuum hose chamber, wherein a proximal end of the hose is connected to the vacuum hose chamber (or to the debris collection chamber if provided); a vacuum source operable to draw air through the debris collection chamber and/or the vacuum hose chamber; and a vacuum hose valve mounted on a wall of the vacuum hose chamber having a vacuum hose port through which the vacuum hose can be drawn into or out of the vacuum hose chamber, the valve having an open position and a closed position, where the vacuum hose is fixed in position when the valve is in the closed position and the vacuum hose may be drawn into or out of the vacuum hose chamber when the valve is in the open position. The vacuum hose may be drawn into the vacuum hose chamber by reduced air pressure created in the vacuum hose chamber by the vacuum source when the vacuum source is operating and the valve is in the open position. When the vacuum hose is drawn into the vacuum hose chamber, air is drawn though the vacuum hose port around the exterior of the vacuum hose when the valve is in the open position. When the valve is closed air is drawn only through a distal end of the vacuum hose, facilitating a cleaning operation of the vacuum.

In such embodiments, the valve may include a flared receiver that surrounds a portion of the vacuum hose port, and a sealing boot having a conical shape that is complementary to the flared receiver. The sealing boot may be inserted into the flared receiver to place the valve in the closed position, creating a substantially airtight seal between the sealing boot and the flared receiver. The valve may be opened by removing the sealing boot from the flared receiver.

Such embodiments may further include a vacuum hose guide connected to the vacuum hose port, wherein the vacuum hose is drawn through the hose guide when it is pulled into or out of the vacuum hose chamber. The vacuum hose guide may include a tube having a plurality of perforations.

In some embodiments, the debris collection chamber may include openings between the debris collection chamber and the vacuum hose chamber that allow air to be drawn between the debris collection chamber and the vacuum hose chamber. The debris collection chamber may include a debris catch that prevents the passage of collected debris from passing from the debris collection chamber into the vacuum hose chamber.

In other embodiments, and without limitation, the present invention relates to a portable apparatus for connection to an external vacuum source (such as a central vacuum system) the apparatus including a vacuum hose; a vacuum hose chamber for storing the vacuum hose; a vacuum hose connector mounted on a wall of the vacuum hose chamber, the vacuum hose connector being for connecting a proximal end of a connecting hose to an external vacuum source; and a vacuum hose valve mounted on a wall of the vacuum hose chamber having a vacuum hose port through which the vacuum hose can be drawn into or out of the vacuum hose chamber, the valve having an open position and a closed position, wherein the vacuum hose is fixed in position when the valve is in the closed position and the vacuum hose may be drawn into or out of the vacuum hose chamber when the valve is in the open position. The vacuum hose connector may include a suction port that is open to the interior of the vacuum hose chamber and creates reduced air pressure within the vacuum hose chamber when the external vacuum source is operating. The vacuum hose may be drawn into the vacuum hose chamber by reduced air pressure created in the vacuum hose chamber when the vacuum source is operating and the valve is in the open position. When the valve is in the open position, air may be drawn though the vacuum hose port around the exterior of the vacuum hose. When the valve is closed, air is drawn only through a distal end of the vacuum hose.

In such embodiments, the valve may include a flared receiver that surrounds a portion of the vacuum hose port, and a sealing boot having a conical shape that is complementary to the flared receiver. The sealing boot may be inserted into the flared receiver to place the valve in the closed position, creating a substantially airtight seal between the sealing boot and the flared receiver. The valve may be opened by removing the sealing boot from the flared receiver.

Such embodiments may further include a vacuum hose guide connected to the vacuum hose port, wherein the vacuum hose is drawn through the hose guide when it is pulled into or out of the vacuum hose chamber. The vacuum hose guide may include a tube having a plurality of perforations.

It is to be understood that there are several variations in the vacuum systems of the present invention, and that the foregoing descriptions of specific embodiments of the present invention have been presented for purposes of illustration and description. They are not intended to be exhaustive or to limit the invention to the precise forms disclosed, and many modifications and variations are possible in light of the teachings herein.

It is an object of the present invention to provide novel hose retraction systems that are operable to retract a hose of the system efficiently after an operator has completed use of the system.

It is an object of the present invention to provide novel hose retraction systems that retract a hose into a chamber or plenum of the system using negative pressure created by an internal or external vacuum source.

It is an object of the present invention to provide novel hose retraction systems that reduce the effort required to deploy and operate the vacuum system.

It is also an object of the present invention to provide novel portable or stationary hose retraction systems in a single compact unit that includes a hose, a chamber or plenum for storing the hose, a vacuum source, and a unique valve mechanism attached to the chamber or plenum for holding or releasing the hose.

It is also an object of the present invention to provide novel hose retraction systems that manage and easily store a long hose within a chamber in the system.

It is also an object of the present invention to provide novel hose retraction systems that allow the user to select the desired length of hose needed to perform a vacuum or suction process.

Additional aspects and objects of the invention will be apparent from the detailed descriptions and the claims herein.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

The retraction systems of the present invention include an airtight chamber body 10 that is capable of holding the majority of the length of a flexible hose 21 within the chamber body. The flexible hose may be of any length or diameter (based upon container capacity size) but preferable embodiments include hoses having a length in a range of about 10 to about 100 foot. A hose in a typical vacuum cleaner application may have a diameter of between about 1.25 inches and about 1.375 inches; in non-vacuum cleaner applications, the hose diameter may be anywhere from about ¼ inch to about six inches, depending on the application. The flexible hose 21 may have exterior spiral ridges (e.g., FIGS. 4C and 4D) or not (e.g., FIGS. 1-3). Vacuum cleaner systems may also include a vacuum source that creates negative pressure in both a filtration chamber 12 (if provided) and in the hose chamber 10 at the same time, allowing for the dual functionalities of allowing the hose to collect debris (when the optional debris collection chamber is provided), and allowing the hose to be automatically retracted, when desired, into the hose chamber 10 by the negative pressure created by the vacuum source. It is not necessary to close off the hose 21 itself for it to be drawn back into chamber 10. It is to be appreciated that such vacuum cleaning systems may be portable or stationary, and also may be self-contained as illustrated, for example, in FIGS. 1 and 3. In vacuum cleaning systems, a container 11 may contain an optional filtration chamber 12 having a disposable filter 13 that is connected with the debris-emitting, proximal end 22 of the flexible hose and that filters debris collected by the hose, as shown in FIG. 3. A vacuum cleaning system may further include one or more optional secondary filters 14 or cyclonic collection buckets between the hose chamber and filtration chamber and the vacuum source (motor) 28. The hose chamber may contain a removable access door or lid 18 to change the filter bag and secondary filter or to empty the cyclonic bucket.

The body of the an exemplary retraction system may be constructed from various rigid materials such as metal, plastic, ceramic, composite, wood, or other materials capable of withstanding high pressure differentials between the exterior and interior of the vacuum system. The systems of the present invention may also have various shapes, such as cylindrical, rectangular box, etc. In some embodiments, the system may have a mounting bracket on it, allowing the vacuum system to be hung on a wall (e.g., in a garage) and used as a portable vacuum or as a shop vacuum. Mounts on the exterior of the body of the unit may be included to allow for attachments to be stored for easy accessibility.

Figure 4A:
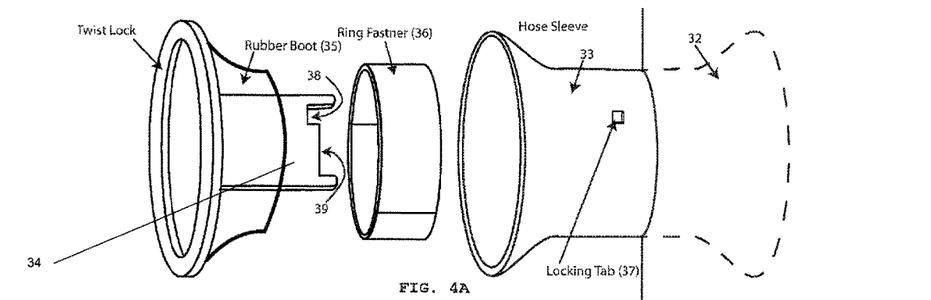
FIG. 4A is an exploded view of an embodiment of a valve assembly according to an embodiment of the present invention.
Figure 4B:
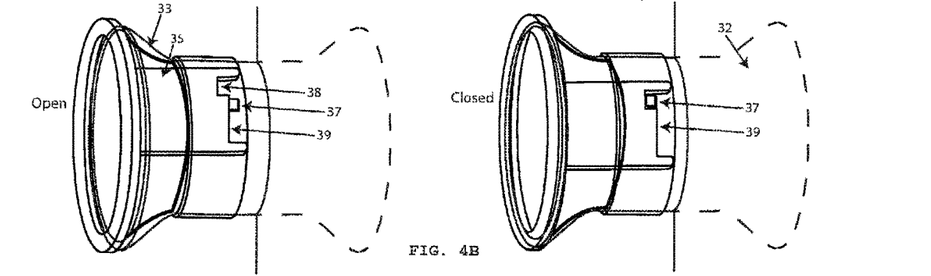
FIG. 4B is a side cutaway view of the valve assembly of FIG. 4A showing open and closed positions.
Figure 4C:
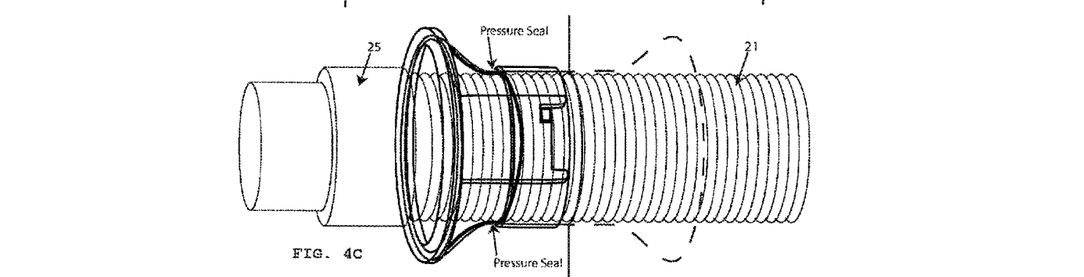
FIG. 4C is a side cutaway view of the valve assembly of FIG. 4A showing a hose therein in a locked or secured position.
Figure 4D:
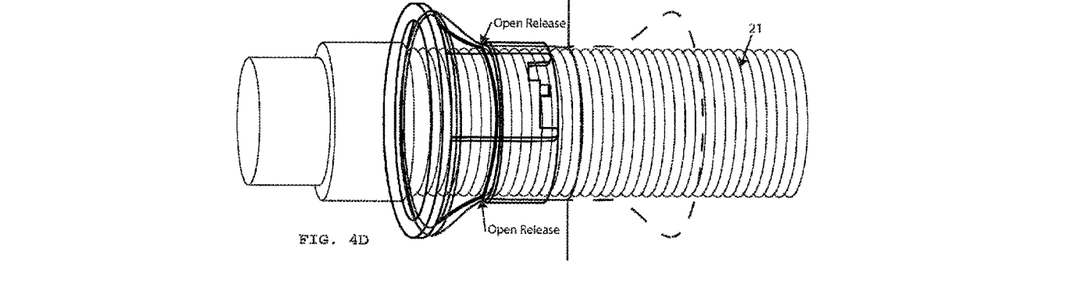
FIG. 4D is a side cutaway view of the valve assembly of FIG. 4A showing a hose therein in an unlocked or released position.

The retraction systems of the present invention may include an outlet port through which the flexible hose 21 may be drawn when the system is in use. The system may include a device 31 for holding the flexible hose in place and sealed to the exterior of the airtight container once the desired length of hose has been extracted. The device may be mechanically or electromechanically controlled to release the hose. For example, the hose holding device 31 may include a conical sealing boot 35 and a flared receiver 33 in the outlet port having a complementary shape to the sealing boot, where the sealing boot 35 may be pressed inward toward the flared receiver 33 and the chamber to create an airtight seal or substantially air-tight seal between the sealing boot 35 and the flared receiver 33. The hose 21 may be fixed in position when the sealing boot is in the sealed position, as shown in FIG. 4C. The sealing boot may also be extended outward from the flared receiver to the unsealed position (FIG. 4D), in which the hose can either be pulled outward to give the operator more slack, or allowed to be retracted into the hose chamber by the vacuum within the hose chamber. It is not necessary to close off hose 21 itself in order to draw it back into the chamber 10; the negative pressure exerted on the interior and exterior surfaces of the hose efficiently draws the hose 21 into the chamber 10 once the user releases the device 31 holding the hose 21.

In some embodiments, the outlet port for the flexible hose may be coupled with a short sleeve 32 to assist in guiding the hose into and out of the hose chamber. It is not necessary to provide a tight fit between the hose 21 and the sleeve 32, nor is it necessary to provide any rings or other structures on the exterior of the hose 21 in order to create sufficient suction on the hose to draw it into the chamber. In the illustrated embodiments, sleeve 32 is part of receiver 33, but these can be separate elements. The sleeve 32 may include air relief holes on portion thereof that is within the hose chamber in order to regulate the speed of the hose retraction. The pressure differential may be such that the hose is violently retracted into the hose chamber without the presence of the air relief holes. The opening of the hose sleeve 32 should be larger than the hose but smaller than the operative end 25 of the hose to prevent it from retracting too far into the body of the hose chamber. The hose end 25 may or may not have an easy-grip end on it to aid in pulling the hose out from the hose chamber. In vacuum cleaning embodiments, the cleaning end of the hose may have a separate detachable handle that will also fit other vacuum attachments.

Embodiments of the present invention may also include an air relief valve 16 in the outer wall of the hose chamber to allow air to bleed into the hose chamber if the pressure differential between the exterior of the hose chamber and the interior of the hose chamber becomes too great (e.g., if the hose and/or valve assembly become clogged). For example, the hose chamber structure may be capable of safely withstanding a threshold pressure differential between the exterior of the hose chamber and the interior of the hose chamber without deformation of the hose chamber. The air relief valve may be configured to allow air to bleed into the hose chamber until a smaller pressure differential than the threshold level is reached.

Referring now to the drawings wherein like reference characters designate like or corresponding parts throughout the several views, and referring particularly to FIGS. 1-4, it is seen that the illustrated embodiments show improved vacuum cleaning systems operable to retract a vacuum hose into a chamber or plenum using the partial vacuum created by the vacuum motor. It is to be appreciated that embodiments of the invention may be adapted for use in systems other than vacuum cleaning such as and without limitation dental devices, medical devices, swimming pools, and the like.

Figure 1:
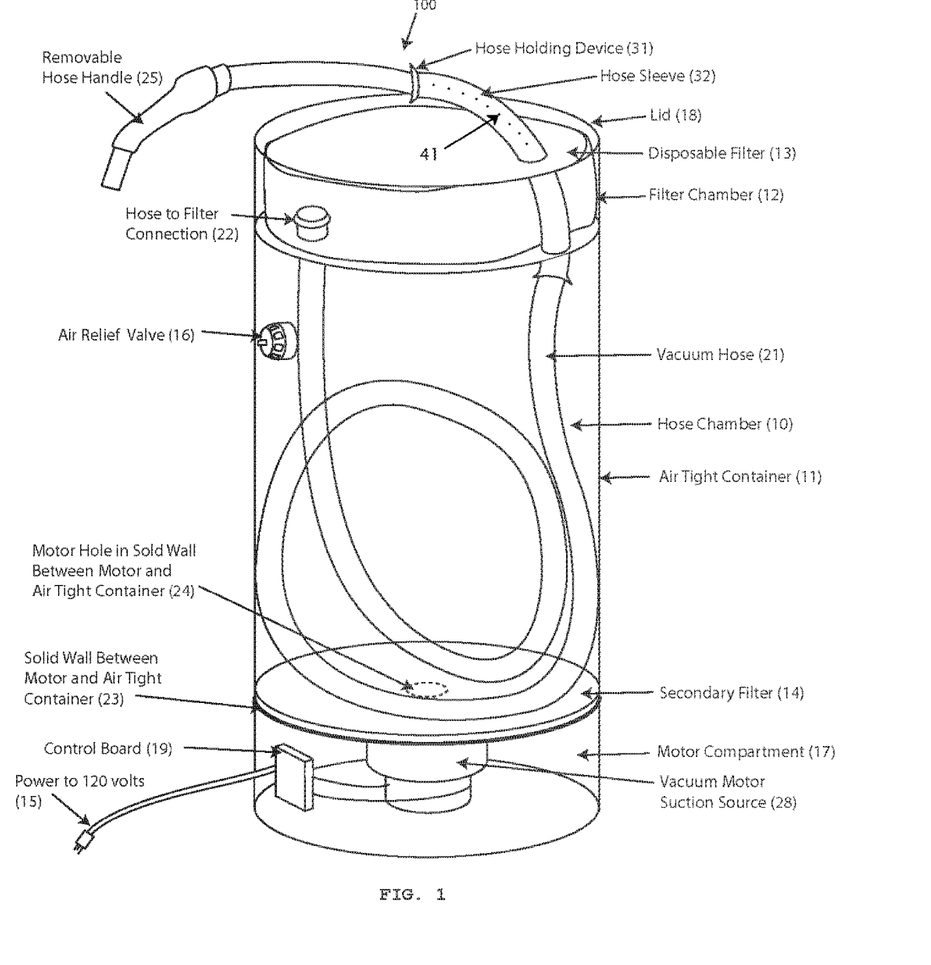
FIG. 1 is a perspective cutaway view of a self-contained hose retraction system according to an embodiment of the present invention.

Without limiting the invention, FIG. 1 shows an exemplary portable or stationary upright vacuum system 100, the vacuum system may have a motor compartment 17 in which a vacuum source such as a motor 28 is housed, along with a control board 19 and wiring between the motor and control board. A power cord 15 may be coupled to the control board to provide power to the motor. A hose chamber 10 may be positioned above the motor compartment 17 and may be separated from the motor compartment by a solid dividing wall 23. An opening 24 may be present in the solid dividing wall 23 between the motor compartment 17 and the hose chamber 10 that allows the vacuum source 28 to remove air from the hose chamber 10 and create negative pressure in the hose chamber.

The hose chamber may include an air relief valve 16 in the outer wall thereof to allow air to bleed into the hose chamber if the pressure differential between the exterior of the hose chamber and the interior of the hose chamber becomes too great.

As further shown in FIG. 1, an optional filter chamber 12 housing a filtration system may be positioned above the hose chamber and is separated from the hose chamber by another dividing wall. The filter chamber may receive and house a disposable filter 13 to catch debris that is collected by the vacuum hose. The dividing wall may have one or more perforations therein to allow air to pass from the hose chamber through the filter chamber to the motor and create suction through the flexible hose. The opening 24 might protrude into the filter chamber or the hose chamber. The flexible hose may be separated from the one or more perforations in the dividing wall by its connection to the disposable filter at a hose to filter connection 22, thereby preventing debris from passing from the flexible hose directly into the hose chamber. The filter chamber may have a lid 18 that can be removed to access and replace the disposable filters housed therein. The lid 18 may be provided in any convenient location (top, bottom, side) adjacent to filter 13.

A hose sleeve 32 may be present in the vacuum system, as shown in FIG. 1, which may act as a guide for the hose from the exterior of the vacuum system to the hose chamber. The hose sleeve may be perforated with air relief holes 41 on a portion thereof that is within the hose chamber in order to regulate the speed of the hose retraction. Also, the hose handle 25 may have a diameter that may be larger than the hose but smaller than the cleaning end of the hose to prevent it from retracting too far into the body of the hose chamber. A removable hose handle may be present on the cleaning end of the hose for ergonomic ease of use.

The vacuum system 100 may further include a valve apparatus for holding the flexible hose in place and sealed to the exterior of the airtight container once the desired length of hose has been extracted. For example, the valve apparatus may include a conical sealing boot 35 and a flared receiver 33 in the outlet port as described herein. It is to be understood that other sealing and hose arresting devices are contemplated within the scope of the present invention.

As shown in FIG. 1, the majority of the length of the vacuum hose of the vacuum system of FIG. 1 may be retracted into and stored in the hose chamber.

Figure 2:
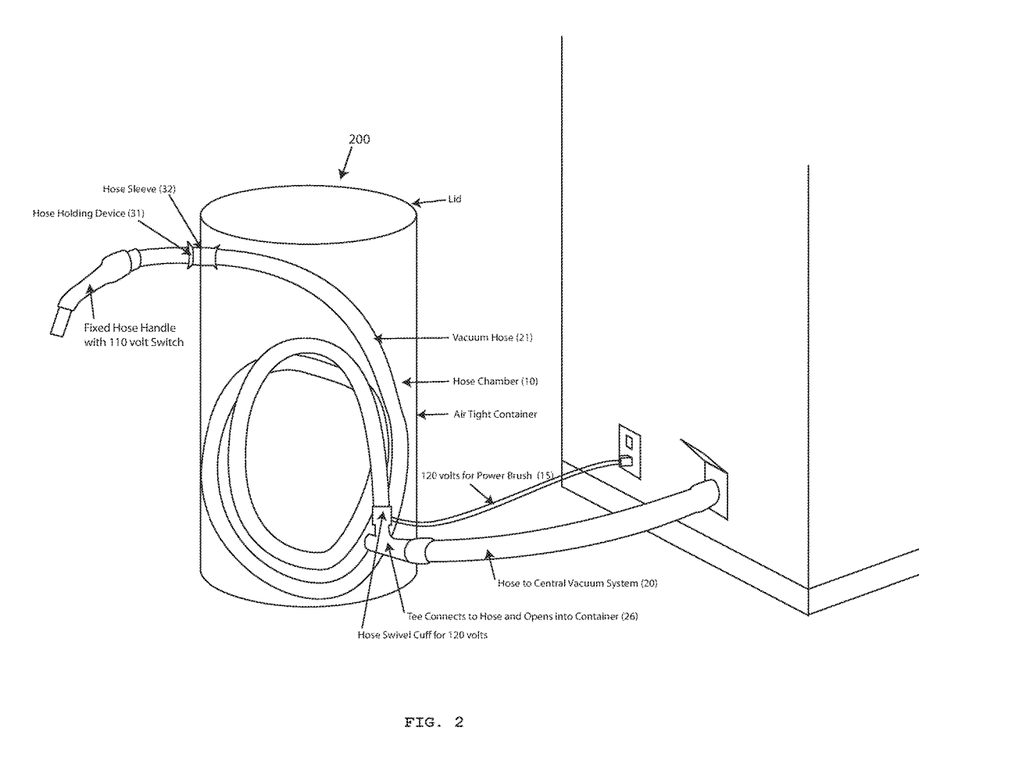
FIG. 2 is a perspective cutaway view of a hose retraction system according to another embodiment of the present invention for use with an external vacuum source.
Figure 3:
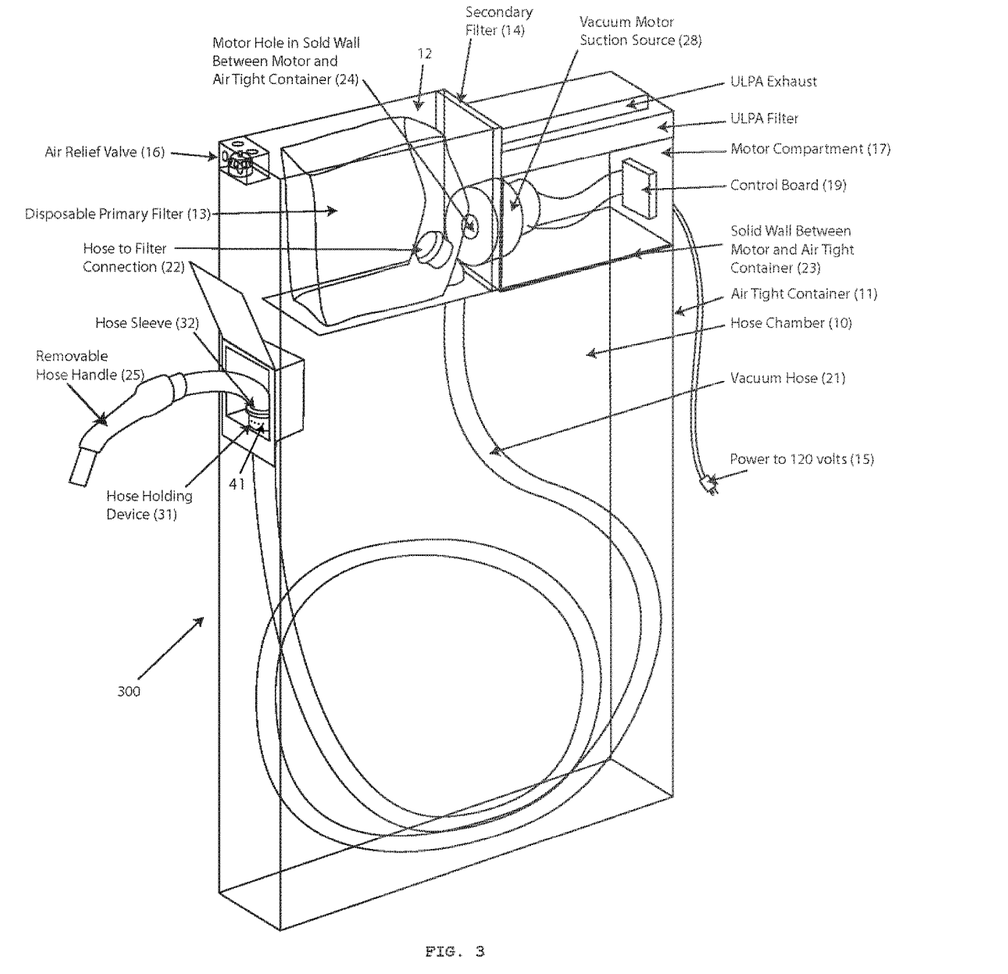
FIG. 3 is a perspective cutaway view of another self-contained hose retraction system according to another embodiment of the present invention.

Without limiting the invention, FIG. 2 shows an exemplary portable upright vacuum cleaning hose retraction system 200 that can be utilized in combination with a whole-house vacuum system. This exemplary hose retraction system does not have any vacuum suction itself, but instead relies on an exterior vacuum source, i.e., that provided by the whole-house system. These systems include a hose 20 for connecting to the central vacuum system that may plug into a vacuum outlet in the wall or floor, and a T connector 26 positioned in the outer wall of the body of the hose retraction system to which the connector hose is attached. The hose retraction system 200 includes a hose chamber 10 that is airtight for retracting and housing the hose 21. The T portion of the connector is within the vacuum system and may have one branch that is open to the hose chamber and a second branch with a hose swivel cuff for connecting to the flexible vacuum hose.

The hose chamber may include an air relief valve in the outer wall thereof to allow air to bleed into the hose chamber if the pressure differential between the exterior of the hose chamber and the interior of the hose chamber becomes too great.

The hose retraction system 200 may also include electrical wiring and, optionally, control electronics for a power brush head or other electrically powered functions on the hose handle. The system 200 may include power cord for connection to a standard electrical outlet, and wires that may be embedded in the vacuum hose that deliver power to the vacuum handle. The hose retraction system 200 may also include control electronics on the exterior of the hose chamber and/or on the hose handle.

The hose may be drawn out of the hose chamber through an outlet port in the outer wall of the hose chamber. The outlet port may include a hose sleeve 32 to assist in guiding the hose into the hose chamber; however, the hose sleeve is optional. The outlet port may further include a valve apparatus for holding the flexible hose in place and sealed to the exterior of the airtight container once the desired length of hose has been extracted. For example, the valve apparatus may include a conical sealing boot 35 and a flared receiver 33 in the outlet port as described herein. It is to be understood that other sealing and hose arresting devices are contemplated within the scope of the present invention.

The hose retraction system 200 may be adapted for use with any whole-house or central vacuum system, as well as other vacuum systems.

Without limiting the invention, FIG. 3 shows an exemplary portable or stationary vacuum cleaning system 300 that does not require installation, but may be used in a stand-alone environment, or with a whole-house or central vacuum system. This exemplary system can be placed in any available convenient space (e.g., a closet, a laundry room, etc.) and does not need to be bolted into the structure or otherwise installed. It may be an entirely self-contained system that can simply be placed inside or outside of a structure and plugged in for use without any further preparation.

The vacuum system 300 includes an air tight container 11 that includes a hose chamber 10 in which the flexible hose 21 is housed, and a smaller optional compartment 12 for a disposable primary filter 13 that is directly connected to the flexible vacuum hose, and a closed compartment 17 for the vacuum source (motor). There may be a hole 24 between the compartment 17 and the rest of the airtight container 11 such that the vacuum source can remove air from the airtight container 11 to create suction through the flexible hose 21. There may be a secondary filter 14 between the hole 24 and the rest of the airtight container to prevent debris from being drawn into the vacuum source. The vacuum source may be connected to a control board and a power cord mounted in the outer wall of the airtight chamber. The power cord 15 may be connected to standard outlets. The motor compartment may also include an exhaust and a filter for filtering the exhaust down to ULPA levels. The exhaust allows the motor to dissipate heat and air without contaminating the surrounding environment. The filtered exhaust may make the vacuum system 300 and related embodiments appropriate and safe for use inside the home.

The hose chamber 10 may include an air relief valve 16 in the outer wall thereof to allow air to bleed into the hose chamber if the pressure differential between the exterior of the hose chamber and the interior of the hose chamber becomes too great.

The airtight chamber 11 may also have an outlet port in the outer wall thereof that includes a hose sleeve structure 32 and a sealing device 35 for holding the flexible hose in place and sealed to the exterior of the airtight container once the desired length of hose has been extracted. For example, the sealing device may include a conical sealing boot 35 and a flared receiver 33 in the outlet port as described herein. It is to be understood that other sealing and hose arresting devices are contemplated within the scope of the present invention.

In operation, when the vacuum source (motor) 28 of the embodiment of FIG. 3 is turned on, air is removed from the airtight chamber 11 and a low pressure ("negative" pressure) is created within the airtight chamber relative to the ambient pressure. This results in air (along with debris) being drawn through the flexible hose 21 from the exterior of the vacuum system 300. The air and debris are passed through the hose into the optional primary filter 13, where the debris may be collected. The air is constantly being removed from the airtight chamber by the motor 28 during operation to create a constant vacuum. During use, the sealing device may be in the sealed or closed position in which the hose is statically held in the outlet port so that it is not retracted into the hose chamber and the negative pressure is applied completely at the distal end of the hose. When the operator needs to draw the flexible hose out of the chamber or retract the hose, the sealing device may be moved into the unsealed or open position in which hose is not held in static position. Then, the user may draw more hose from the chamber, or allow the negative pressure of the airtight chamber to retract the hose into the hose chamber.

FIG. 4 shows several views of an exemplary sealing device 400 that may be positioned in an outlet port or hose sleeve 32 of the vacuum systems of the present invention. The sealing device or valve assembly may include a collar 36 attached via extension 34 to an elastomeric or rubber boot 35 that is positioned around the hose 21 and adjacent to the outlet port or hose sleeve 32. The hose sleeve has a flared receiver end 33 for engagement with the rubber boot 35, and a locking mechanism for securing the sealing collar and rubber boot 35 in a closed position for operation of the retraction system. The rubber boot 35 may have conical shape and the flared receiver 33 in the outlet port may have a complementary shape, such that when the rubber boot 35 is pressed inward toward the flared receiver 33 and the chamber, an airtight seal or substantially air-tight seal is created between the rubber boot 35 and the flared receiver 33. In the sealed position, an airtight or substantially air-tight seal is created between the rubber boot and both the flared receiver and the hose as well, thereby allowing air intake through only the distal end of the hose and optimizing the suction power of the system during use.

In the open or unsealed position, the rubber boot 35 may be pulled away from the flared receiver 33 allowing the operator to pull the hose from the chamber to a desired length or allowing the hose 21 to be drawn into the chamber 10 solely by the negative pressure in the airtight chamber. In the open condition, the rubber boot allows the hose to pass freely through the outlet port, and the negative pressure in the chamber may be sufficient to draw the hose into the chamber regardless of the length of the hose (assuming sufficient negative pressure, and that the chamber is of sufficient size).

A locking mechanism is provided with the sealing device 400 and may include collar 36 attached via extension 34 to rubber boot 35, said extension having a slot 39 and notch 38 that engages a tab 37 on the hose sleeve 33 to arrest the position of the rubber boot. The locking mechanism can be manipulated (twist locked) by the operator as needed. The left view of FIG. 4B and FIG. 4D both show the locking mechanism in an unlocked or released position. In these views, it is seen that tab 37 is engaged with slot 39, which prevents collar 36 and rubber boot 35 from engaging directly against sleeve 33. Twisting rubber boot 35 and collar 36, and pushing them inward results in locking or closing the locking mechanism, as shown in the right view of FIG. 4B and FIG. 4C. Both of these views show the locking mechanism in locked or closed position. In these views, it is seen that tab 37 is engaged with smaller notch 38, allowing collar 36 to move inward, and rubber boot 35 to be pressed directly against sleeve 33 creating an airtight seal. To unlock, boot 35 and collar 36 need simply be pulled out and twisted such that tab 37 is again positioned in slot 39.

It is to be understood that other sealing and hose arresting devices are contemplated within the scope of the present invention.

The present invention provides hose retraction systems that are operated using air pressure alone. It is to be understood that there are several variations in the thermally insulative container that provide additional benefits, as disclosed above. It should also be understood that the foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A portable vacuum cleaning unit having a hose retraction apparatus, comprising:

a. a vacuum hose;
b. a portable housing comprising a wide vacuum hose chamber for storing said vacuum hose in a loose configuration within said chamber;
c. a vacuum source positioned within said housing and being operable to evacuate said vacuum hose chamber to create a partial vacuum in said vacuum hose chamber when said vacuum source is operating and draw air and debris through said vacuum hose into a debris collection chamber positioned within said housing and adjacent to said vacuum hose chamber; and
d. a vacuum hose valve extending through a wall of said vacuum hose chamber having a vacuum hose port having an outer open end external to the wall through which said vacuum hose can be drawn into or out of said vacuum hose chamber, said port comprising a sleeve body having a tab located thereon and a flared receiver at the outer end, an elastomeric sealing boot extending into the open end of said receiver and positioned around said hose, said boot having a flared outer end shape that is complementary to the shape of the receiver, and an extension attached to said boot extending away from said outer end in an axial direction of the port, said extension having a recessed extending in the axial direction into the extension and along a length in a substantially circumferential direction of the port for engagement with said tab, said slot having a recessed notch extending further in the axial direction into said extension for engagement with said tab, said valve having an open position when said tab is located in said slot and external to said notch and a closed position when said tab is located in said notch, wherein said vacuum hose is fixed in position and said boot is sealingly engaged against said receiver when said valve is in said closed position, and said vacuum hose may be drawn into or out of said vacuum hose chamber and said boot is not engaged against said receiver when said valve is in said open position.

2. The apparatus of claim 1 wherein an end of said hose is in communication with said debris collection chamber such that said vacuum source draws air through said debris collection chamber and through said vacuum hose chamber.

3. The apparatus of claim 1, wherein said valve further comprises a flared receiver that surrounds a portion of said vacuum hose port, and an elastomeric sealing boot having a shape that is complementary to the flared receiver.

4. The apparatus of claim 3, wherein said sealing boot is moved in an axial direction toward said flared receiver to place the valve in said closed position.

5. The apparatus of claim 4, wherein a substantially airtight seal is created between said sealing boot and said flared receiver when said valve is in said closed position.

6. The apparatus of claim 3, wherein said sealing boot is moved in an axial direction away from said flared receiver to place the valve in said open position.

7. The apparatus of claim 3, wherein said valve further comprises an extension attached to said sealing boot, said extension having an elongated slot at an edge thereof, and notch in said slot, and said flared receiver further comprises a tab thereon.

8. The apparatus of claim 7, wherein said valve is in said closed position when said tab is located in said notch, and said valve is in said open position when said tab is located in said slot.

9. The apparatus of claim 1, wherein said debris collection chamber includes openings between said debris collection chamber and said vacuum hose chamber that allow air to be drawn between said debris collection chamber and said vacuum hose chamber.

10. The apparatus of claim 9, wherein said debris collection chamber includes a debris catch that prevents the passage of collected debris from passing from the debris collection chamber into said vacuum hose chamber.

11. The apparatus of claim 1, further comprising a vacuum hose guide connected to said vacuum hose port, wherein said vacuum hose is drawn through said hose guide when it is pulled into or out of said vacuum hose chamber.

12. The apparatus of claim 11, wherein said vacuum hose guide has a plurality of perforations therein.

13. A portable vacuum cleaning unit having a hose retraction apparatus, comprising:
a. a vacuum hose;
b. a portable vacuum hose chamber for storing said vacuum hose in a loose configuration within said chamber;
c. a vacuum source operable to draw air through said vacuum hose chamber; and
d. a vacuum hose port extending through a wall of said vacuum hose chamber and having an outer open end external to the wall through which said vacuum hose can be drawn into or out of said vacuum hose chamber, said port comprising a sleeve body having a tab located thereon and a flared receiver at the outer end, an elastomeric sealing boot extending into the open end of said receiver and positioned around said hose, said boot having a flared outer end shape that is complementary to the shape of the receiver, and an extension attached to said boot extending away from said outer end in an axial direction of the port, said extension having a recessed slot extending in the axial direction into the extension and along a length in a substantially circumferential direction of the port for engagement with said tab, said slot having a recessed notch extending further in the axial direction into said extension for engagement with said tab, such that said boot is sealingly engaged against said receiver when said tab is located in said notch, and said boot is not engaged against said receiver when said tab is located in said slot and external to said notch.

14. The portable vacuum cleaning unit of claim 13 wherein said vacuum hose is fixed in position when said boot is engaged against said receiver, and said vacuum hose may be drawn into or out of said vacuum hose chamber when said boot is not engaged against said receiver.

\* \* \* \* \*